(12) United States Patent
Suzuki et al.

(10) Patent No.: US 10,779,122 B2
(45) Date of Patent: Sep. 15, 2020

(54) SYSTEM, INFORMATION PROCESSING DEVICE, INFORMATION PROCESSING METHOD, AND STORAGE MEDIUM

(71) Applicant: NS SOLUTIONS CORPORATION, Tokyo (JP)

(72) Inventors: Hiroki Suzuki, Tokyo (JP); Takao Kakimori, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 0 days.

(21) Appl. No.: 16/495,315

(22) PCT Filed: Mar. 1, 2018

(86) PCT No.: PCT/JP2018/007783
§ 371 (c)(1),
(2) Date: Sep. 18, 2019

(87) PCT Pub. No.: WO2018/180171
PCT Pub. Date: Oct. 4, 2018

(65) Prior Publication Data
US 2020/0100062 A1    Mar. 26, 2020

(30) Foreign Application Priority Data
Mar. 28, 2017    (JP) .................................. 2017-063239

(51) Int. Cl.
*H04W 4/02*    (2018.01)
*H04W 4/029*    (2018.01)
*G01S 19/40*    (2010.01)

(52) U.S. Cl.
CPC ............ *H04W 4/027* (2013.01); *G01S 19/40* (2013.01); *H04W 4/029* (2018.02)

(58) Field of Classification Search
CPC ...................................................... H04W 4/02
See application file for complete search history.

(56) References Cited

U.S. PATENT DOCUMENTS

| 2015/0201301 | A1* | 7/2015 | Takaoka | H04W 4/029 455/456.1 |
| 2017/0245116 | A1* | 8/2017 | Chu | H04B 17/318 |

FOREIGN PATENT DOCUMENTS

| JP | 4-29079 A | 1/1992 |
| JP | 8-313278 A | 11/1996 |
| JP | 2007-232450 A | 9/2007 |

OTHER PUBLICATIONS

International Preliminary Report on Patentability issued from the International Bureau in counterpart International Application No. PCT/JP2018/007783, dated Oct. 10, 2019.

(Continued)

*Primary Examiner* — Michael T Vu
(74) *Attorney, Agent, or Firm* — Arent Fox LLP (57) ABSTRACT

Second position information is identified from a plurality of pieces of position information of a terminal device. The plurality of pieces of position information are obtained via a position information obtainer before first position information of the terminal device. The first position information is obtained via the position information obtainer. The second position information is used for correcting the first position information. The first position information is corrected based on the identified second position information.

13 Claims, 7 Drawing Sheets

(56) References Cited

OTHER PUBLICATIONS

International Search Report and Written Opinion, issued by International Searching Authority in corresponding International Application No. PCT/JP2018/007783, dated May 29, 2018, (PCT/ISA/210 & PCT/ISA/237).

* cited by examiner

RETRIEVAL RANGE

CORRECTION TARGET POSITION INFORMATION

REFERENCE POSITION INFORMATION

POSITION INFORMATION HAVING INAPPROPRIATE ACCURACY

POSITION INFORMATION AFTER CORRECTION

SYSTEM, INFORMATION PROCESSING DEVICE, INFORMATION PROCESSING METHOD, AND STORAGE MEDIUM

CROSS-REFERENCE TO RELATED APPLICATIONS

The present application is a National Stage entry of International Application No. PCT/JP2018/007783, filed on Mar. 1, 2018, which claims priority to Japanese Patent Application No. 2017-063239, filed Mar. 28, 2017. The disclosures of the prior applications are incorporated herein by reference in their entirety.

TECHNICAL FIELD

The present invention relates to a system, an information processing device, an information processing method, and a storage medium.

BACKGROUND ART

By obtaining position information using a GPS function included in a mobile terminal and the like, monitoring is performed, for example, where is a user carrying the mobile terminal and the like, with which route the user is moving, or whether the user approaches a restricted area, a hazardous area, and the like or not.

However, GPS information used for obtaining the position has a problem in accuracy, and especially, inside a building or when approaching a high-rise building, the mobile terminal and the like cannot catch a satellite to cause a big error between an actual position and a detected position in some cases.

There has been proposed an idea where correction of the position information is performed to such an error to provide the position information closer to the actual position.

In Patent Literature 1, with a communication controller configured to communicate with a monitoring terminal, when a difference between a calculated position at this time and a current display position is larger than a position detection allowable error, a point closest to the current display position on a circumference of an error distribution circle is determined as an estimated position at this time. When the difference between the calculated position at this time and the current display position is smaller than the position detection allowable error, a point internally dividing between the current display position and the calculated position at this time in a predetermined ratio is determined as the estimated position at this time. Then, between the current display position and the calculated position at this time is further divided into a predetermined number, and smoothly displayed on a screen on the monitoring terminal side at every refresh rate of the screen. This reduces an unnatural screen display due to the position detection error and ensures more natural display of a worker's movement.

CITATION LIST

Patent Literature

Patent Literature 1: Japanese Laid-open Patent Publication No. 2007-232450

SUMMARY OF INVENTION

Technical Problem

In Patent Literature 1, while the position is corrected with the position detection allowable error based on a movement distance, the correction accuracy has never been sufficient.

Solution to Problem

Therefore, a system of the present invention includes an identifier and a corrector. The identifier is configured to identify second position information from a plurality of pieces of position information of a terminal device. The plurality of pieces of position information are obtained via a position information obtainer before first position information of the terminal device. The first position information is obtained via the position information obtainer. The second position information is used for correcting the first position information. The corrector is configured to correct the first position information based on the second position information identified by the identifier.

Advantageous Effects of Invention

According to the present invention, position information can be more accurately corrected.

DESCRIPTION OF EMBODIMENTS

The following describes embodiments of the present invention based on the drawings.

Embodiment 1

(Outline)

Figure 1:
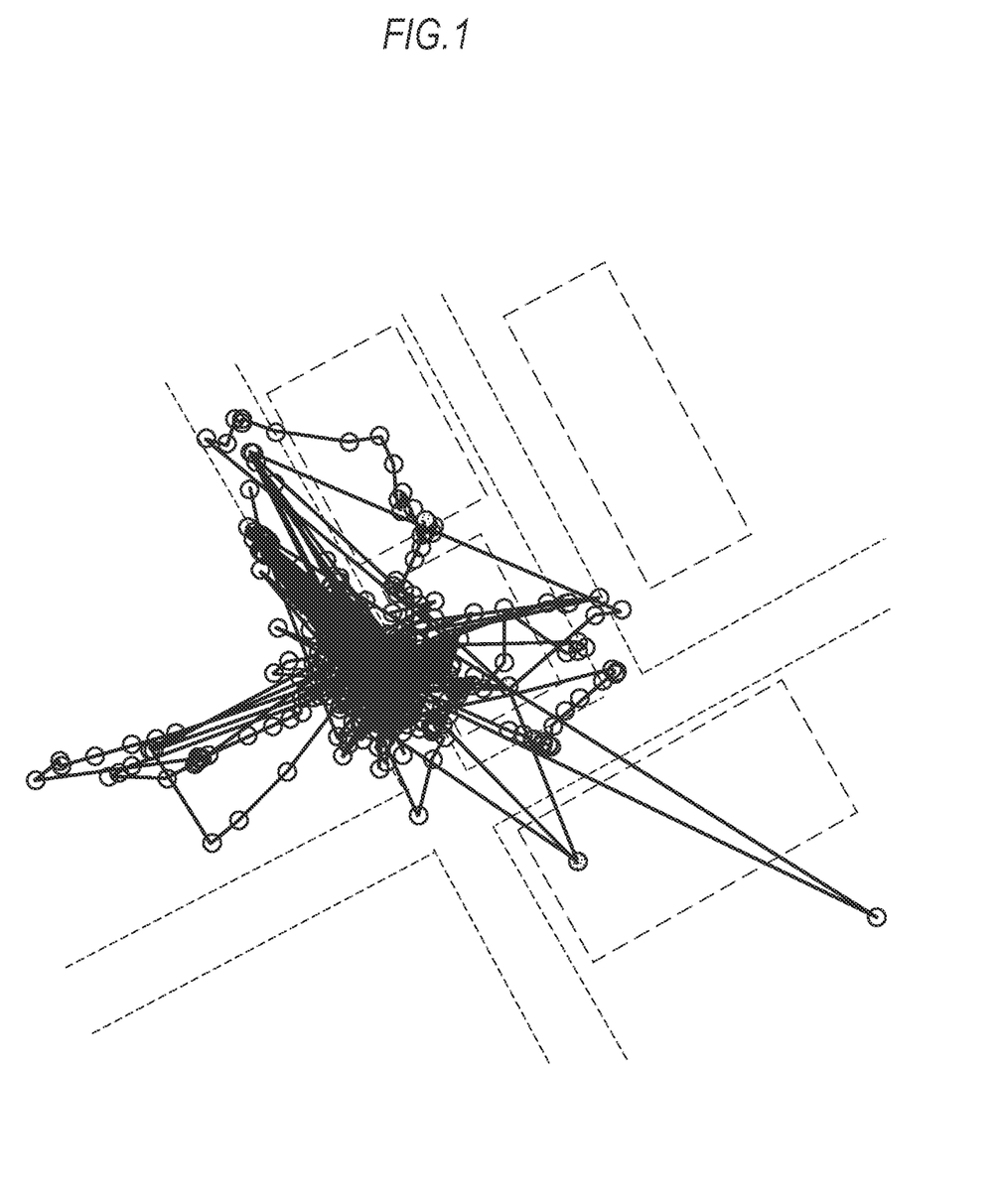
FIG. 1 is a drawing illustrating an exemplary result of obtaining position information via a GPS function.

FIG. 1 is a drawing illustrating an exemplary result of obtaining position information of a mobile terminal via a GPS function. The GPS function is a function to obtain the position information of a terminal device 201 based on a signal received from a GPS satellite. When the mobile terminal is present inside a building or close to a high-rise building, the mobile terminal cannot catch the signal from the satellite and fails to obtain accurate position information in some cases. The example of FIG. 1 illustrates a state where, when the mobile terminal is inside the building, the position information fluctuates due to position information obtained as if the mobile terminal flies around the building and suddenly obtained far position information. The position information is information on the position of an object, and includes information (information on a latitude, a longitude, a coordinate, and the like) indicative of the position of the object, information on its accuracy, information on a traveling direction of the object, and the like. The position information may include information on an elevation at which the object is positioned. The position information may include information on a time when the object is present at the position indicated by the position information.

In this embodiment, a description will be given of a process where an information processing system corrects the position information to reduce an influence of such a deviation.

(System Configuration of Information Processing System)

Figure 2:
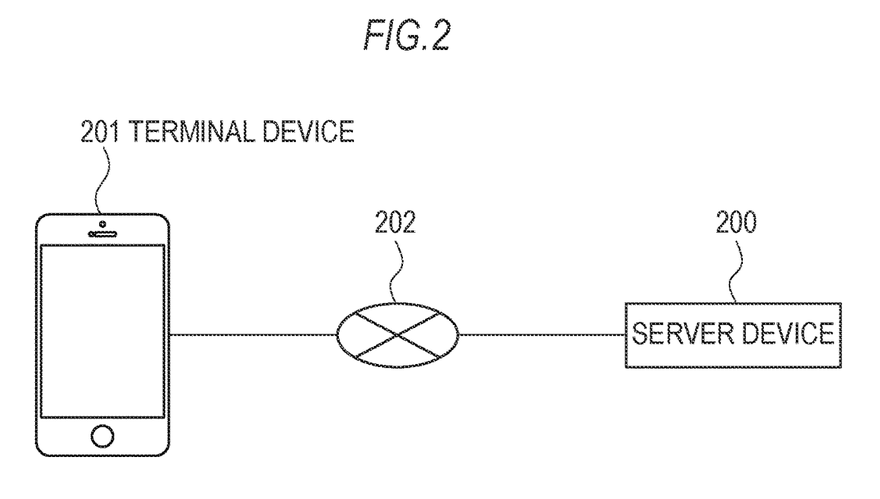
FIG. 2 is a drawing illustrating an exemplary system configuration of an information processing system.

FIG. 2 is a drawing illustrating an exemplary system configuration of an information processing system of this embodiment. The information processing system includes a server 200 and the terminal device 201. The server 200 and the terminal device 201 are mutually communicatively connected via a network 202 including Internet, a LAN, and the like.

The server 200 is an information processing device, such as a personal computer (PC) and a server device, configured to obtain the position information of the terminal device 201 obtained by the terminal device 201 using the GPS function from the terminal device 201 and correct the obtained position information.

The terminal device 201 is a terminal type information processing device, such as a tablet device, a smart phone, and smart glasses, configured to use the GPS function to obtain the position information of the terminal device 201 and transmit the obtained position information to the server 200.

While the information processing system in this embodiment includes one terminal device as the terminal device 201 and obtains the position information of the one terminal device, a plurality of, two or more, terminal devices may be included as the terminal devices 201 to obtain the position information for each terminal device.

(Hardware Configuration of Each Component of Information Processing System)

Figure 3:
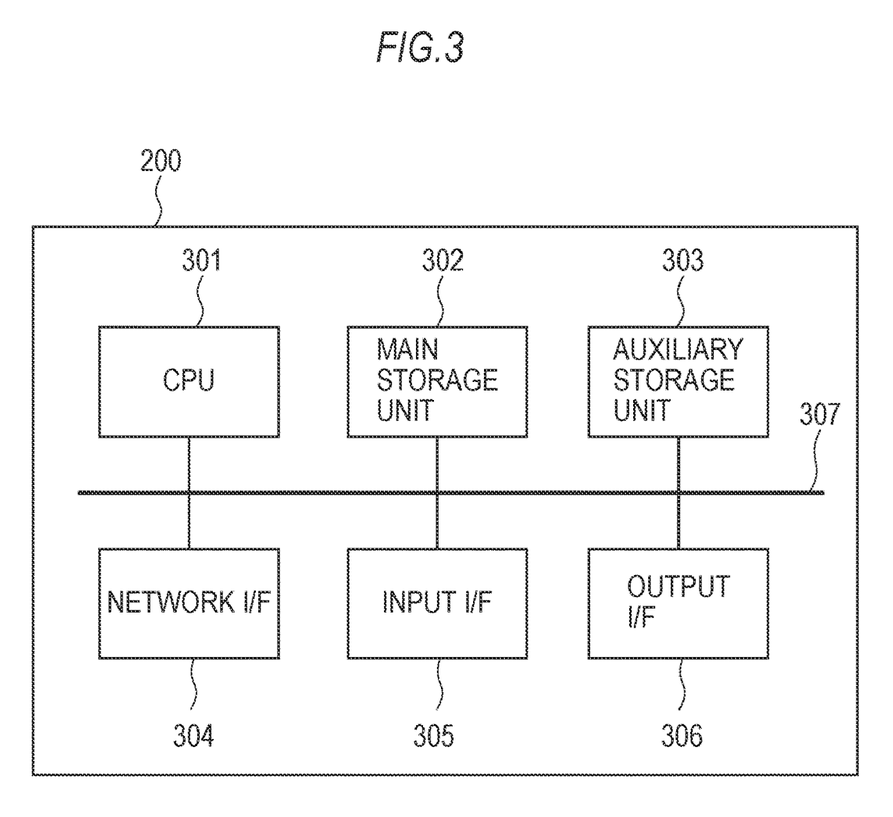
FIG. 3 is a drawing illustrating an exemplary hardware configuration of a server device.

FIG. 3 is a drawing illustrating an exemplary hardware configuration of the server 200. The server 200 includes a CPU 301, a main storage unit 302, an auxiliary storage unit 303, a network I/F 304, an input I/F 305, and an output I/F 306. The components are mutually communicatively connected via a system bus 307.

The CPU 301 is a central processing unit configured to control the server 200. The main storage unit 302 is a storage device such as a Random Access Memory (RAM) that functions as a work area of the CPU 301 and a temporary storage area of data. The auxiliary storage unit 303 is a storage device configured to store various programs, various setting information, the position information of the terminal device 201, the information indicative of various correction methods, the information on various threshold values, and the like. The auxiliary storage unit 303 includes a storage medium such as a Read Only Memory (ROM), a hard disk drive (HDD), and a solid state drive (SSD).

The network I/F 304 is an interface used for the communication with an external device such as the terminal device 201 via the network 202. The input I/F 305 is an interface used for input of the information from an input device such as a computer mouse, a keyboard, a touchpad, a touchscreen, and the like. The output I/F 306 is an interface used for output of the information to an output device such as a display device, for example, a monitor, a display, and a touchscreen, and a sound outputting device. In this embodiment, the display device is connected to the output I/F 306. The display device connected to the output I/F 306 is an exemplary display unit of the server 200.

With the CPU 301 executing the processes based on the programs stored in the auxiliary storage unit 303, the function of the server 200, the processes of the flowcharts described later in FIGS. 9 to 11, and the like are achieved.

Figure 4:
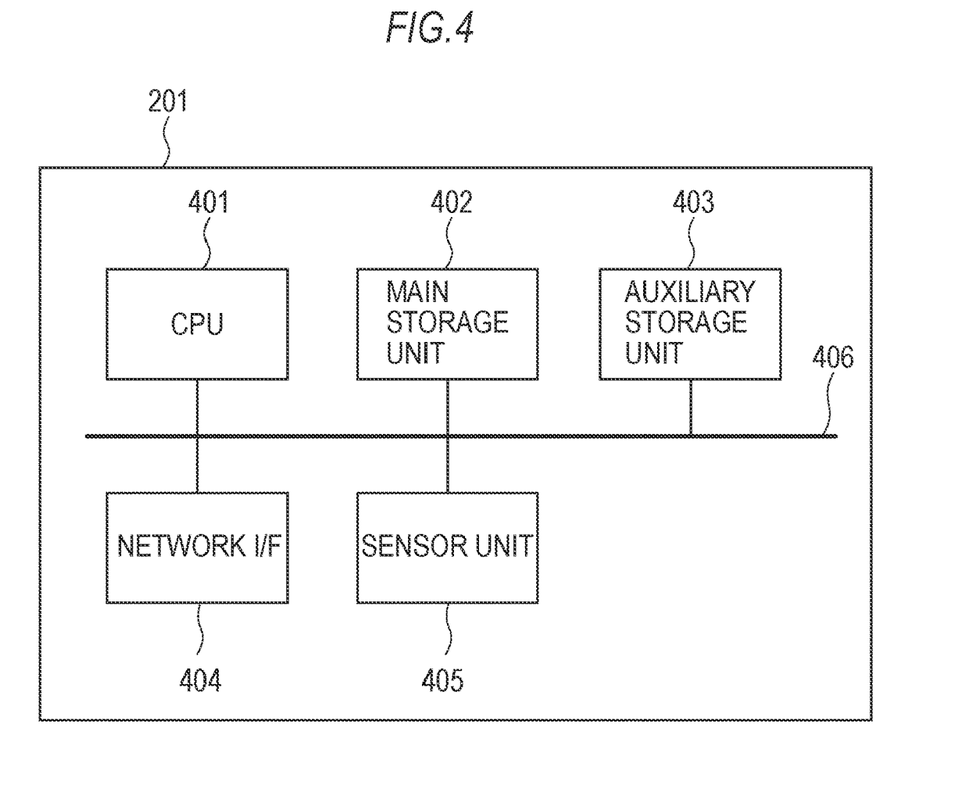
FIG. 4 is a drawing illustrating an exemplary hardware configuration of a terminal device.

FIG. 4 is a drawing illustrating an exemplary hardware configuration of the terminal device 201. The terminal device 201 includes a CPU 401, a main storage unit 402, an auxiliary storage unit 403, a network I/F 404, and a sensor unit 405. The components are mutually communicatively connected via a system bus 406.

The CPU 401 is a central processing unit configured to control the terminal device 201. The main storage unit 402 is a storage device such as a RAM that functions as a work area of the CPU 401 and a temporary storage area of data. The auxiliary storage unit 403 is a storage device configured to store various programs, various setting information, the position information of the terminal device 201, and the like. The auxiliary storage unit 403 includes a storage medium such as a ROM, a HDD, and an SSD. The network I/F 404 is an interface used for the communication with an external device such as the server 200 via the network 202.

The sensor unit 405 is a sensor configured to receive a signal from the GPS satellite. In this embodiment, the CPU 401 periodically receives the signal from the GPS satellite at configured intervals via the sensor unit 405, and continues to obtain the position information of the terminal device 201 based on the received signal. In this embodiment, the GPS function is a function to obtain the position information of the terminal device 201 based on the signal from the GPS satellite received via the sensor unit 405. While the terminal device 201 continues to periodically obtain the position information of the terminal device 201 at intervals of five seconds in this embodiment, the terminal device 201 may continue to obtain it at other intervals of 10 seconds and the like. Then, the CPU 401 transmits the obtained position information to the server 200 every time when the position information of the terminal device 201 is obtained. The CPU 301 continues to store the position information of the terminal device 201 received from the terminal device 201 in the auxiliary storage unit 303. Then, the CPU 301 corrects the correction target position information based on the position information of the terminal device 201 consecutive in the time series and stored in the auxiliary storage unit 303.

With the CPU 401 executing the processes based on the programs stored in the auxiliary storage unit 403, the functions of the terminal device 201 (for example, the GPS function), the processes of the terminal device 201, and the like are achieved.

(Correction Method)

Figure 5:
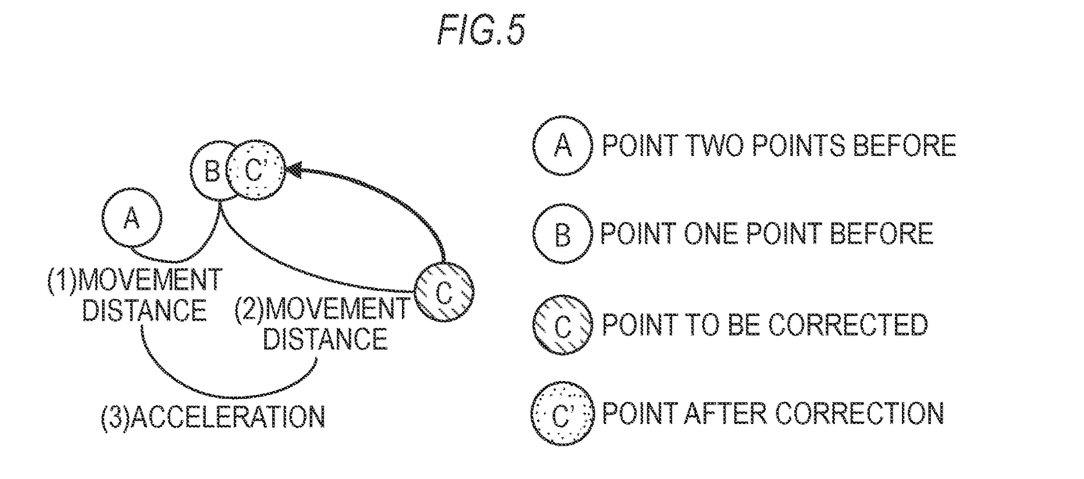
FIG. 5 is a drawing describing an exemplary correction method.
Figure 6:
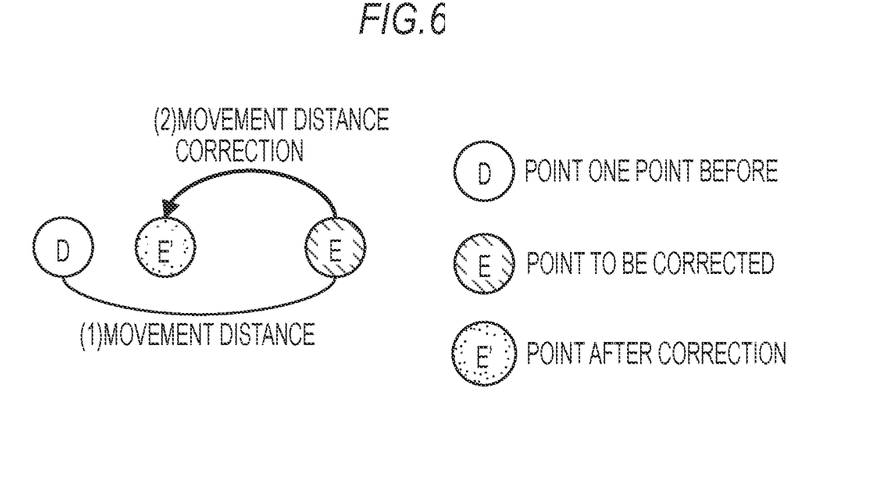
FIG. 6 is a drawing describing an exemplary correction method.

The following describes a correction method for the position information using FIGS. 5 and 6.

FIG. 5 is a drawing describing an exemplary correction method for the position information. Using FIG. 5, a description will be given of the method for correcting the position information by the CPU 301 of the server 200 based on a movement distance between points indicated by the position information of the terminal device 201 obtained via the GPS function. A point A, a point B, and a point C in FIG. 5 are points indicated by the position information of the terminal device 201 obtained via the GPS function. The point C is a point indicated by the latest position information of the terminal device 201. The point B is a point indicated by the position information of the terminal device 201 obtained one point before the point C. The point A is a point indicated by the position information of the terminal device 201 obtained one point before the point B (two points before the point C). In the example of FIG. 5, the position information corresponding to the point C is assumed to the correction target.

The carrying the terminal device 201 can be regarded as movement with transportation means such as walking, bicycle, vehicle, train, and airplane. In this embodiment, the position information of the terminal device 201 is continuously obtained via the GPS function. When a difference (apparent movement distance of the terminal device 201) between a position indicated by one position information and a position indicated by position information obtained one point before the one position information is a distance that is impossible in the movement with those transportation means, the one position information can be regarded as inaccurate position information.

However, there is a case where the movement distance is impossible by walking or bicycle but possible by vehicle or train, and there is a case where the movement distance is impossible by walking, bicycle, vehicle, or train but possible by airplane. Therefore, the CPU 301 fails to obtain whether the movement distance between those two points has a possible value or not simply based on only the value of the difference between the two points in some cases.

Therefore, in this embodiment, the CPU 301 obtains an apparent acceleration of the terminal device 201 at the correction target position information from the movement distance between the correction target position information and the position information obtained one point before the correction target position information and the movement distance between the position information obtained one point before the correction target position information and the position information obtained two points before the correction target position information, and the CPU 301 determines whether the correction target position information has moved by the impossible movement distance or not based on the obtained acceleration.

In the example of FIG. 5, the CPU 301 obtains the movement distance and direction from the point A to the point B. Next, the CPU 301 obtains the movement distance and direction from the point B to the point C. Then, the CPU 301 obtains the apparent acceleration of the terminal device 201 at the point C based on the movement distance and direction from the point A to the point B and the movement distance and direction from the point B to the point C. The movement distance and direction from the point A to the point B and the movement distance and direction from the point B to the point C each indicate in which direction and how long the terminal device 201 apparently moved in five seconds as an interval of the position information obtaining. That is, the movement distance and direction from the point A to the point B and the movement distance and direction from the point B to the point C can be each regarded as an indication of apparent speed and traveling direction of the terminal device 201. Therefore, the CPU 301 can obtain the apparent acceleration of the terminal device 201 from the movement distance and direction from the point A to the point B and the movement distance and direction from the point B to the point C.

For example, when the movement distance and direction from the point A to the point B is 10 m and a due east direction and the movement distance and direction from the point B to the point C is 30 m and the due east direction, the CPU 301 determines that the terminal device 201 moved from the point A to the point B at the speed of 2 (m/s) in the due east direction, and the terminal device 201 moved from the point B to the point C at the speed of 6 (m/s) in the due east direction. That is, with the increase in speed of the terminal device from 2 (m/s) to 6 (m/s) in five seconds, the CPU 301 obtains the acceleration at the point C as (6 (m/s)−2 (m/s))/5 (s)=0.8 m/s$^2$. When the movement direction from the point B to the point C is a due west direction, with a deceleration in the due east direction by 2 (m/s) and an acceleration in the opposite direction by 6 (m/s), the CPU 301 obtains the acceleration at the point C as (6 (m/s)+2 (m/s))/5 (s)=1.6 m/s$^2$. When the movement direction from the point B to the point C is a due north direction, the terminal device 201 is considered to have been decelerated in the due east direction by 2 (m/s) and accelerated in the due north direction by 6 (m/s). Then, the CPU 301 obtains acceleration in the due east direction as 2 (m/s)/5 (s)=0.4 (ms$^2$), and obtains the acceleration in the due north direction as 6 (m/s)/5 (s)=1.2 (ms$^2$). Accordingly, the CPU 301 obtains the whole acceleration at the point C as $((0.4 (m/s^2))^2+(1.2 (m/s^2))^2)^{1/2} \approx 1.26$ m/s$^2$.

Then, the CPU 301 determines whether the obtained acceleration at the point C is equal to or more than a set threshold value (for example, 4.9 m/s$^2$) or not. When the obtained acceleration is less than the set threshold value, since the impossible movement has not occurred, the CPU 301 determines the position information of the point C as the position information unnecessary to be corrected. When the obtained acceleration is equal to or more than the set threshold value, since the impossible movement has occurred, the CPU 301 corrects the position information of the point C. In the example of FIG. 5, the CPU 301 updates the position information of the point C so as to have content identical to that of the position information of the point B obtained one point before. In the example of FIG. 5, it is seen that a point C' corresponding to the updated position information overlaps the point B. However, the CPU 301 may perform the correction with a method other than the method to update the position information so as to have the content identical to that of the position information one point before. For example, the CPU 301 may update the correction target position information such that the point B indicates a point to which the positional change from the point A to the point B is applied with an assumption that the terminal device 201 similarly moves from the point A to the point B.

With the correction method described with FIG. 5, even when the position information indicative of a position far from the actual position of the terminal device 201 is suddenly obtained, the CPU 301 can correct this position information with more accuracy.

FIG. 6 is a drawing describing an exemplary correction method for the position information. Using FIG. 6, a description will be given of the method for correcting the position information by the CPU 301 based on accuracy information corresponding to the position information of the terminal device 201 obtained via the GPS function. A point D and a point E in FIG. 6 are points indicated by the position information of the terminal device 201 obtained via the GPS function. The point E is a point indicated by the latest position information of the terminal device 201. The point D is a point indicated by the position information of the terminal device 201 obtained one point before the point E. In the example of FIG. 6, the position information corresponding to the point E is assumed to be the correction target.

The position information obtained via the GPS function includes Accuracy information indicating the accuracy of that position information. The Accuracy information is exemplary accuracy information indicating the accuracy of the position. The Accuracy information includes information indicating how many meters of the error the position indicated by that position information has as the accuracy. Corresponding to a magnitude of the error indicated by the Accuracy information, the accuracy of the position indicated by that position information is lowered. Therefore, corresponding to the error indicated by the Accuracy information, the CPU 301 corrects the correction target position information so as to adjust the movement distance from the position indicated by the position information obtained one point before.

The CPU 301 performs, for example, the following processes. That is, the CPU 301 identifies the error of the correction target position information from the Accuracy information of the correction target position information. Then, when the identified error is equal to or more than the set threshold value, the CPU 301 determines that the accuracy is less than a set level, and when the identified error is less than the set threshold value, the CPU 301 determines that the accuracy is equal to or more than the set level. When the accuracy of the correction target position information is determined to be less than the set level, the CPU 301 identifies in which direction and by what movement distance the position indicated by the correction target position information has been moved from the position indicated by the position information obtained one point before the correction target position information. The CPU 301 corrects the correction target position information such that the corresponding position indicates the position moved from the position indicated by the position information obtained one point before the correction target position information in the identified direction by a distance $1/\log_{10}$ (identified error) times of the identified movement distance.

Thus, when the error is equal to or more than the set threshold value, the CPU 301 corrects the correction target position information so as to decrease the movement distance from the position indicated by the position information one point before corresponding to the magnitude of the error, and reduces deviation of the position information, such as moving around a certain position, thus ensuring more accurate correction. Since the CPU 301 corrects the movement distance so as to be inversely proportional to the logarithm of the error, the deviation of the position can be reduced even when the error is significantly large.

For example, assume that the position of the point E corresponding to the correction target position information is a position apart from the position of the point D corresponding to the position information obtained one point before to the due east by 15 m, and the error indicated by the Accuracy information of the correction target position information is 1000 m. In this case, the CPU 301 corrects the correction target position information so as to indicate a point E' as a position moved from the point D to the due east by 5 m obtained by multiplying 15 m as the movement distance by $1/\log_{10} (1000) = 1/3$.

The CPU 301 may decide how long the movement distance is from the position indicated by the position information obtained one point before to a position to which the position indicated by the correction target position information is corrected, as follows. The CPU 301 may correct the position indicated by the correction target position information to a position moved from the position indicated by the position information obtained one point before by a fixed distance corresponding to the error indicated by the Accuracy information of the correction target position information.

With the correction method described with FIG. 6, since the CPU 301 reduces the movement distance when the accuracy of the position information is less than the set level, the deviation of the position, such as moving around a certain position, indicated by the position information can be reduced.

(Correction Link)

In this embodiment, the CPU 301 is configured to correct the position information of the terminal device 201 obtained via the GPS function using the position information obtained at least one point before that position information. When the accuracy of the position information obtained one point before is the accuracy equal to or more than the set level, the CPU 301 can correct the position information based on that position information. However, in the case of the position information having inappropriate accuracy where the accuracy of the position information obtained one point before is less than the set level, the CPU 301 cannot correct the position information.

Therefore, in this embodiment, the CPU 301 is configured to identify the position information having the appropriate accuracy, where the accuracy is equal to or more than the set level, from a plurality of pieces of the position information of the terminal device 201 obtained via the GPS function further in the past than the correction target position information, thus correcting the correction target position information.

Figure 7:
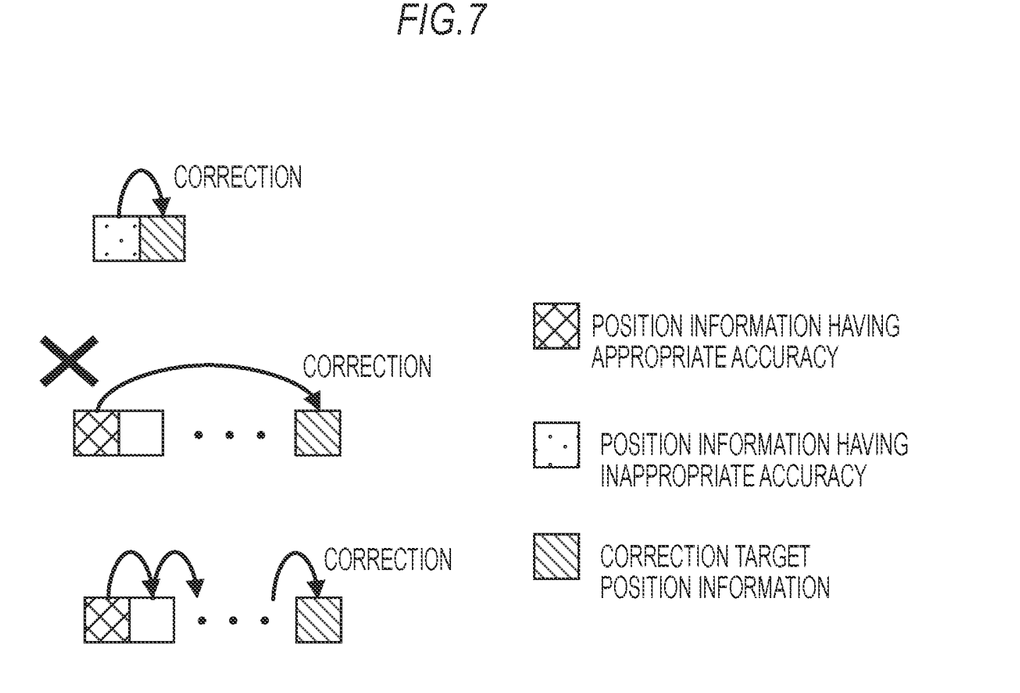
FIG. 7 is a drawing describing an exemplary correction link.

FIG. 7 is a drawing describing an exemplary correction link. With FIG. 7, a description will be given of the process for correcting the correction target position information by the CPU 301 based on the position information that is obtained before the correction target position information and has the accuracy equal to or more than the set level.

An upper outline drawing in FIG. 7 is a drawing illustrating the outline of the correction of the correction target position information based on the position information having the accuracy less than the set level obtained one point before the correction target position information (point to be corrected). Thus, when the accuracy of the position information obtained one point before is less than the set level, the CPU 301 cannot accurately perform the correction.

Therefore, the CPU 301 is configured to identify the position information having the accuracy equal to or more than the set level from the position information obtained before the correction target position information, and correct the correction target position information based on the identified position information. In this embodiment, the CPU 301 identifies the position information having the accuracy equal to or more than the set level from the position information obtained before the correction target position information based on the accuracy information included in the position information. For example, the CPU 301 identifies the position information where the error indicated by the Accuracy information included in the position information is less than the set threshold value to the position information having the accuracy equal to or more than the set level. In this embodiment, the CPU 301 is configured to identify the latest position information based on information about time, which is included in each piece of the position information, indicating the presence of the terminal device 201 at the position indicated by that position information in the position information that is obtained before the correction target position information and has the accuracy equal to or more than the set level.

However, as illustrate in a middle outline drawing in FIG. 7, the CPU 301 cannot directly correct the correction target position information with the position information obtained two or more points before the correction target position information. Therefore, the CPU 301 uses the identified position information to correct the position information obtained next to the identified position information. Then, the CPU 301 corrects the position information obtained next to the corrected position information based on the corrected position information. The CPU 301 links the above-described correction process until the correction target position information is corrected. Accordingly, the CPU 301 links the correction process based on the past position information having the accuracy equal to or more than the set level to ensure more accurate correction of the correction target position information.

The CPU 301 is configured to retrieve the position information having the accuracy equal to or more than the set level from the position information obtained before the correction target position information. The CPU 301 can determine the number of pieces of the position information to be retrieved based on a specification from the user via the input device of the server 200. The CPU 301 may determine a preliminarily set number as the number of pieces of the position information to be retrieved. The CPU 301 can raise the success rate of the retrieval of the position information having the accuracy equal to or more than the set level by increasing the number of pieces of the position information to be retrieved.

(Outline of Correction Process)

Figure 8:
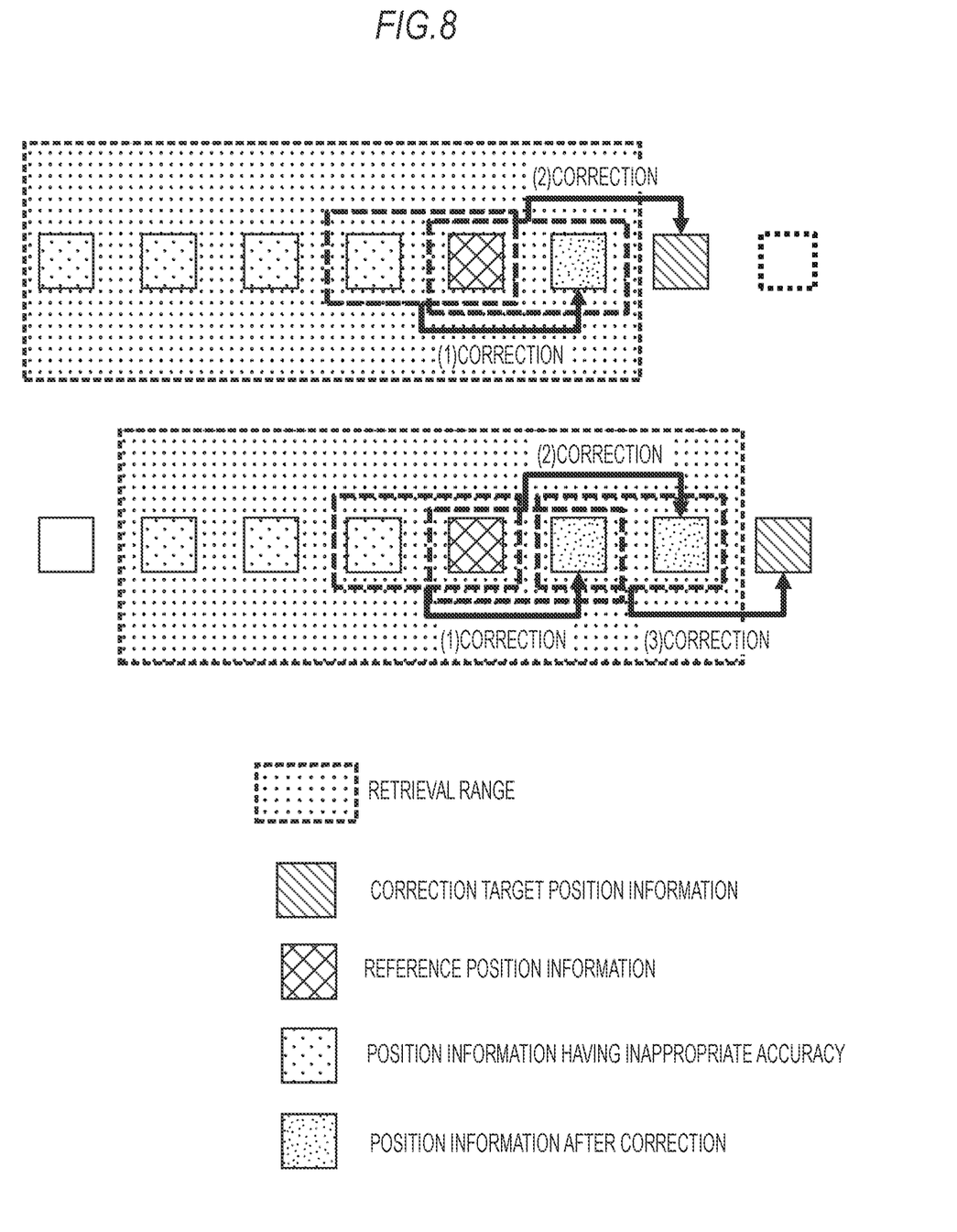
FIG. 8 is a drawing describing an exemplary outline of a correction process.

FIG. 8 is a drawing describing an exemplary outline of the correction process of the position information of the terminal device 201 performed by the server 200 of this embodiment.

In this embodiment, every time when the position information is transmitted from the terminal device 201, the CPU 301 determines the transmitted position information as the correction target position information, which is a correction target, and identifies the position information having the accuracy equal to or more than the set level from the position information in a retrieval range among the position information obtained before the correction target position information. Then, the CPU 301 determines the identified position information as reference position information as a reference of the correction, sequentially corrects the following position information to link the correction, and thus corrects the correction target position information. That is, the CPU 301 corrects the position information for each piece of the position information transmitted from the terminal device 201.

As illustrated in an upper outline drawing in FIG. 8, for example, when the position information of the terminal device 201 is obtained, the CPU 301 has that position information as the correction target position information, and identifies the position information having the accuracy equal to or more than the set level from the position information included in the retrieval range (in the example of FIG. 8, six pieces of the position information obtained before the correction target position information) among the position information obtained before the correction target position information. In the example of the upper outline drawing in FIG. 8, the CPU 301 identifies the position information two points before the correction target position information and determines it as the reference position information.

Then, the CPU 301 performs the correction process described with FIG. 5 on the position information one point after the reference position information (one point before the correction target position information) based on the reference position information and the position information one point before the reference position information. Next, the CPU 301 corrects the correction target position information based on the corrected position information and the reference position information. The CPU 301 links the correction for the correction method described with FIG. 5 and the correction method described with FIG. 6. More specifically, the CPU 301 performs the correction on the position information one point after the reference position information (one point before the correction target position information) with the correction method of FIG. 5 based on the reference position information, and subsequently performs the correction with the correction method of FIG. 6. Then, the CPU 301 corrects the correction target position information with the correction method of FIG. 5 and the correction method of FIG. 6 based on the corrected position information (position information one point before the correction target position information). With the above-described process, the CPU 301 terminates the correction of the correction target position information.

When the position information next to the correction target position information where the correction has been completed is received from the terminal device 201, the CPU 301 has the received position information as new correction target position information and performs the similar correction process.

As illustrated in a lower outline drawing in FIG. 8, the CPU 301 is configured to identify the position information three points before the correction target position information as the position information having the accuracy equal to or more than the set level to determine it as the reference position information. The CPU 301 is configured to link the correction having this reference position information as a reference to correct the correction target position information.

However, in the examples of the two outline drawings in FIG. 8, the CPU 301 identifies the mutually identical position information to the reference position information. Therefore, the corrections of the position information one point before (previous correction target position information) and the position information two points before the correction target position information with the correction method of FIG. 5 and the correction method of FIG. 6 have an identical result. In this embodiment, the position information directly used for the correction of the correction target position information is the position information one point before and the position information two points before the correction target position information. Accordingly, under the state of the lower outline drawing in FIG. 8, the CPU 301 may be configured to perform the following process instead of linking the correction based on the reference position information. That is, the CPU 301 may perform the correction on the correction target position information with the correction method of FIG. 5 based on the correction results of the position information one point before and the position information two points before the correction target position information with the correction method of FIG. 5 and the correction method of FIG. 6 in the previous correction link (upper outline drawing in FIG. 8).

The CPU 301 may perform the correction on the correction target position information with the correction method of FIG. 6 based on the correction result of the position information one point before the correction target position information in the previous correction link.

Thus, the CPU 301 may be configured to store the correction results of respective pieces of the position information between the reference position information and the correction target position information in the main storage unit 302 and the auxiliary storage unit 303 in each correction link, and perform the following process. That is, the CPU 301 may be configured such that when the position information similar to the reference position information in the previous correction link is identified to the reference position information, the previous correction result of the position information immediately before the stored correction target position information is used to correct the correction target position information. Thus, the CPU 301 can reduce a load for an unnecessary process.

(Detail of Process of Information Processing System)

Figure 9:
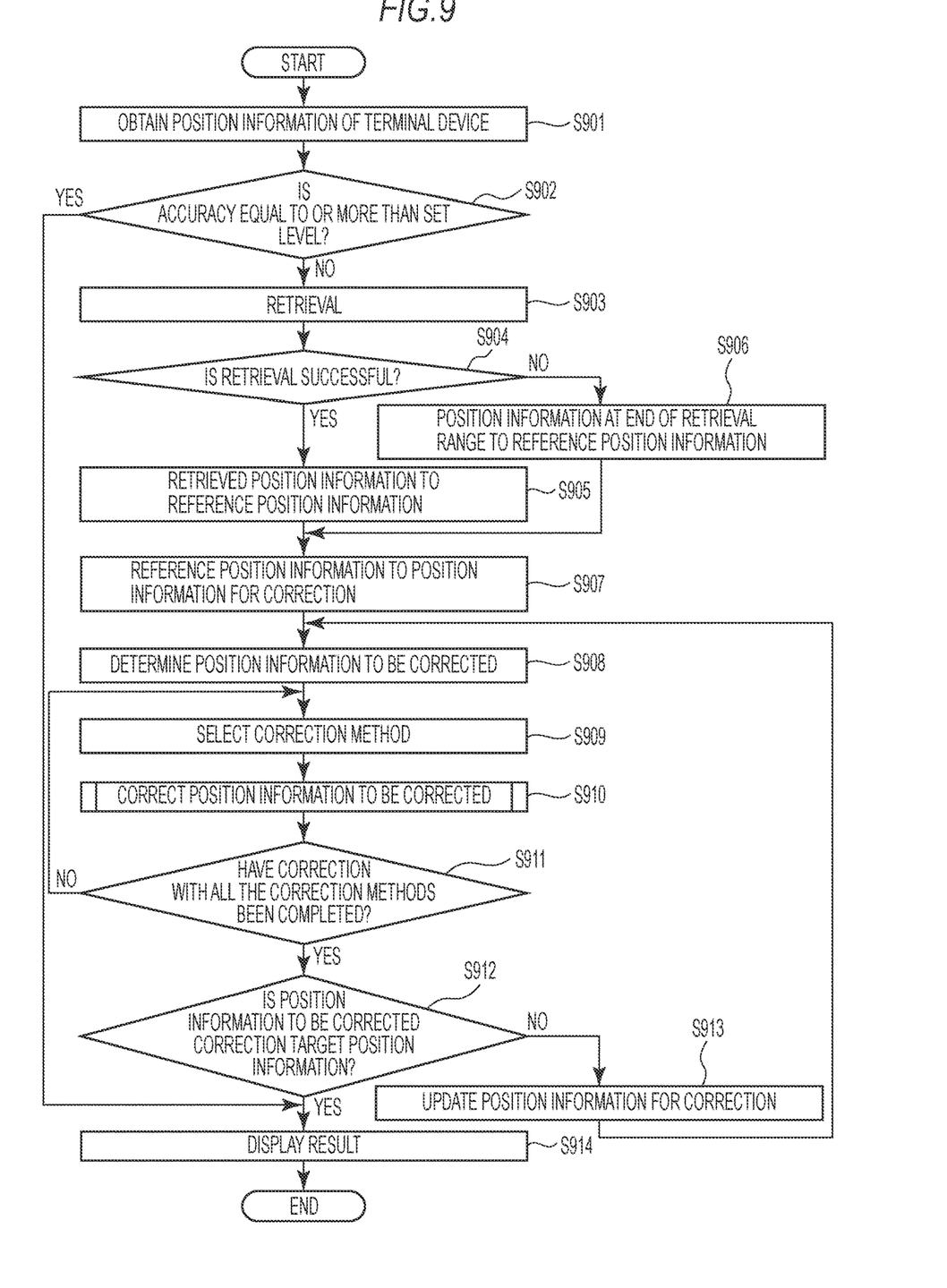
FIG. 9 is a flowchart illustrating an exemplary position information correction process.

FIG. 9 is a flowchart illustrating an exemplary position information correction process.

In S901, the CPU 301 obtains the position information of the terminal device 201 obtained from the terminal device 201 via the GPS function, and determines it as the correction target position information.

In S902, the CPU 301 determines whether the accuracy of the correction target position information is equal to or more than the set level or not based on the accuracy information included in the correction target position information obtained in S901. For example, when the error indicated by the Accuracy information included in the correction target position information is less than the set threshold value, the CPU 301 determines that the accuracy of the correction target position information is equal to or more than the set level. For example, when the error indicated by the Accuracy information included in the correction target position information is equal to or more than the set threshold value, the CPU 301 determines that the accuracy of the correction target position information is less than the set level.

When the accuracy of the correction target position information is determined to be equal to or more than the set level, the CPU 301 advances the process to S914, and when the accuracy of the correction target position information is determined to be less than the set level, the CPU 301 advances the process to S903.

In S903, the CPU 301 retrieves the position information having the accuracy equal to or more than the set level from the position information received from the terminal device 201 before the correction target position information. The CPU 301 retrieves, for example, the latest position information having the accuracy equal to or more than the set level in the set retrieval range (for example, the position information received from the terminal device 201 before the correction target position information within the past one hour of the current time).

In S904, the CPU 301 determines whether the retrieval in S903 is successful or not. When the retrieval in S903 is determined to be successful, the CPU 301 advances the process to S905, and when the retrieval in S903 is determined to be failure, the CPU 301 advances the process to S906.

In S905, the CPU 301 determines the position information retrieved in S903 as the reference position information, which becomes the reference of the correction process.

In S906, the CPU 301 assumes the earliest position information among the position information included in the retrieval range in S903 as the position information having the accuracy equal to or more than the set level, and determines that position information to the reference position information. The CPU 301 may determine the position information having the highest accuracy (for example, the error indicated by the Accuracy information is minimum) among the position information included in the retrieval range in S903 as the reference position information.

In S907, the CPU 301 determines the reference position information determined in S905 or S906 as position information for correction, which is the position information used for the correction.

In S908, the CPU 301 determines the position information received from the terminal device 201 next to the position information for correction as position information to be corrected, which is the position information corrected based on the position information for correction.

In S909, the CPU 301 selects the correction method executed to the position information to be corrected. For example, the CPU 301 reads information, which is preliminarily stored in the auxiliary storage unit 303 and the like, indicative of a list of the correction methods to be executed, and selects one of the correction methods indicated by the read information. In this embodiment, the CPU 301 selects one of the correction method described with FIG. 5 and the correction method described with FIG. 6. In this embodiment, the CPU 301 is configured to select the correction method described with FIG. 5 in the first process of S909 at first, and select the correction method described with FIG. 6 in the second process of S909 on one piece of the position information to be corrected.

In S910, the CPU 301 corrects the position information to be corrected based on the position information for correction. Details of the process of S910 will be described later with FIG. 10 and FIG. 11.

In S911, the CPU 301 determines whether all the correction methods to be executed have been selected in S909 and the correction with all the correction methods have been completed to the current position information to be corrected or not. When the correction with all the correction methods is determined to have been completed for the current position information to be corrected, the CPU 301 advances the process to S912, and when the correction with not all the correction method is determined to have been completed for the current position information to be corrected, the CPU 301 advances the process to S909.

In S912, the CPU 301 determines whether the current position information to be corrected is the correction target position information or not. When the current position information to be corrected determined to be the correction target position information, the CPU 301 advances the process to S914, and when the current position information to be corrected is determined not to be the correction target position information, the CPU 301 advances the process to S913.

In S913, the CPU 301 updates the position information for correction by determining the position information to be corrected to which the correction with all the correction methods to be executed has been completed as new position information for correction.

In S914 the CPU 301 outputs the correction target position information. The CPU 301 may be configured to output the position indicated by the correction target position information by displaying on the display unit of the server 200 while superimposing the position on a map. The CPU 301 may further display the respective positions of the position information corrected in the past in the correction link on the display unit. In this case, the CPU 301 may be configured to further indicate line segments sequentially connecting the position information on the display unit for understanding movement progress of the terminal device 201. The CPU 301 may be configured to output the correction target position information by storing it in the auxiliary storage unit 303 and the like.

Figure 10:
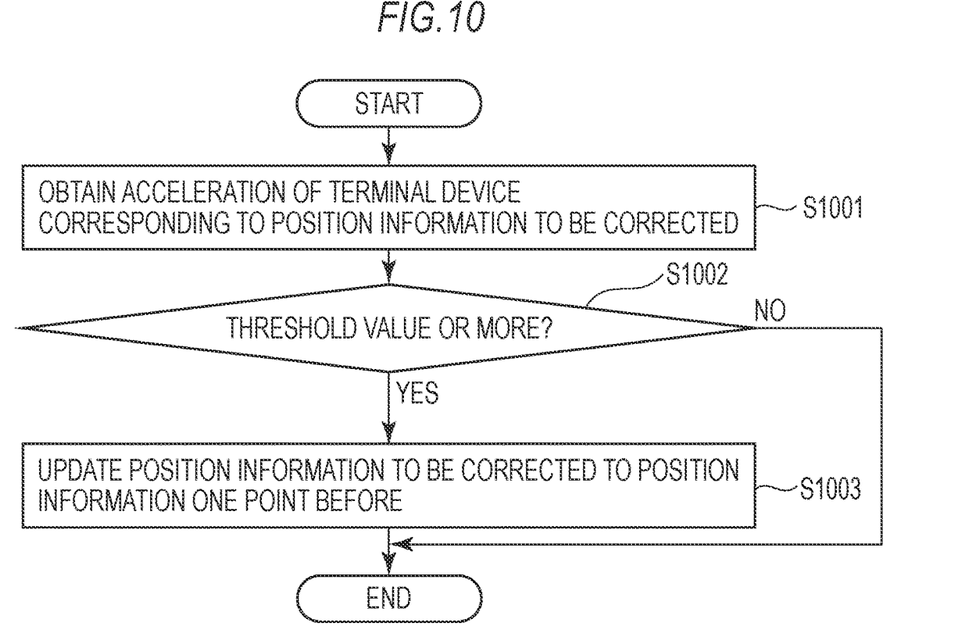
FIG. 10 is a flowchart illustrating an exemplary detail of the correction process.

FIG. 10 is a flowchart illustrating an exemplary correction process. With FIG. 10, a description will be given of the process of S910 in detail in the case where the correction method of FIG. 5 is selected in S909.

In S1001, the CPU 301 obtains the apparent acceleration of the terminal device 201 at the position information to be corrected based on the position information (position information for correction) received from the terminal device 201 one point before the position information to be corrected and the position information received from the terminal device 201 two points before the position information to be corrected. When the position information received from the terminal device 201 two points before the position information to be corrected is corrected in the processes of S909 to S911, the CPU 301 uses the position information after correction as the position information received from the terminal device 201 two points before the position information to be corrected.

As described with FIG. 5, the CPU 301 identifies the movement distance and the movement direction between the position indicated by the position information two points before and the position indicated by the position information one point before. The CPU 301 identifies the movement distance and the movement direction between the position indicated by the position information one point before and the position indicated by the position information to be corrected. Then, the CPU 301 obtains the apparent acceleration of the terminal device 201 at the position information to be corrected based on the identified movement distance and movement direction.

In S1002, the CPU 301 determines whether the acceleration obtained in S1001 is equal to or more than the set threshold value or not. When the acceleration obtained in S1001 is determined to be equal to or more than the set threshold value, the CPU 301 advances the process to S1003. When the acceleration obtained in S1001 is determined to be less than the set threshold value, the CPU 301 determines the position information to be corrected as the position information equal to or more than the set level, and terminates the process of FIG. 10 without performing the correction.

In S1003, the CPU 301 corrects the content of the information indicative of the position included in the position information to be corrected to the content identical to that of the position information one point before the position information to be corrected.

Figure 11:
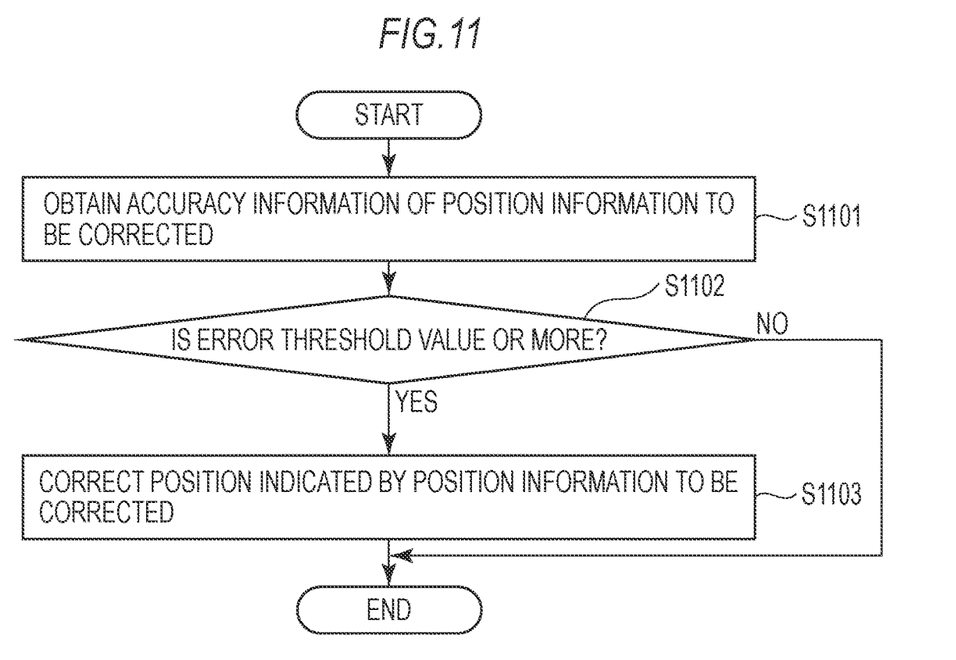
FIG. 11 is a flowchart illustrating an exemplary detail of the correction process.

FIG. 11 is a flowchart illustrating an exemplary correction process. With FIG. 11, a description will be given of the process of S910 in detail in the case where the correction method of FIG. 6 is selected in S909.

In S1101, the CPU 301 obtains the accuracy information included in the position information to be corrected. In this embodiment, the CPU 301 obtains the Accuracy information as the information indicative of the position error.

In S1102, the CPU 301 determines whether the error indicated by the Accuracy information obtained in S1101 is equal to or more than the set threshold value or not. When the error indicated by the Accuracy information obtained in S1101 is determined to be equal to or more than the set threshold value, the CPU 301 advances the process to S1103. When the error indicated by the Accuracy information obtained in S1101 is determined to be less than the set threshold value, the CPU 301 determines the position information to be corrected as the position information equal to or more than the set level, and terminates the process of FIG. 11 without performing the correction.

In S1103, the CPU 301 corrects the position information to be corrected based on the position information for correction with the method similar to that of FIG. 6.

(Conclusion)

As described above, in this embodiment, when the position information of the terminal device 201 obtained via the GPS function is received from the terminal device 201, the server 200 determines the received position information as the correction target position information as the correction target. Then, the server 200 identifies the position information having the accuracy equal to or more than the set level from the position information received before the correction target position information, determines it as the reference position information, and links the correction with the reference position information as a starting point, thus correcting the correction target position information based on the reference position information. Accordingly, even in the case of failing to obtain the position information having the accuracy equal to or more than the set level immediately before the correction target position information, the server 200 links the correction based on the reference position information to ensure the more accurate correction of the correction target position information.

In this embodiment, the server 200 is configured to correct the position information based on the movement distance between the positions indicated by the position information of the terminal device 201 obtained via the GPS function. Accordingly, even in such a case where the position information indicative of a far position is suddenly obtained, the server 200 removes the influence of such position information to ensure the more accurate correction of that position information.

In this embodiment, the server 200 is configured to correct the position information of the terminal device 201 obtained via the GPS function based on the error indicated by the accuracy information of that position information so as to decrease the movement distance from the position indicated by the position information one point before corresponding to the magnitude of the error. Accordingly, the server 200 reduces the deviation of the position information, such as moving around a certain position, to ensure the more accurate correction of that position information.

In this embodiment, the server 200 is configured to perform the correction with the correction method described with FIG. 5 and subsequently perform the correction with the correction method described with FIG. 6 to the position information. That is, the server 200 removes the influence of the position information that can be regarded as an outlier displaced from former or latter position information by an extreme distance with the correction method of FIG. 5, and subsequently reduces the deviation of the position information with the correction method of FIG. 6. Accordingly, the server 200 can reduce more deviation of the position information compared with the case where the deviation of the position information is reduced simply with the correction method of FIG. 6.

(Modification)

In this embodiment, the server 200 is configured as a single information processing device. However, the server 200 may be configured as a server system that includes a plurality of information processing devices. In this case, the CPUs of the respective information processing devices in the server system are linked to execute the process based on the programs stored in the auxiliary storage units of the respective information processing devices, thus achieving the function of the server 200, the process of the flowchart of FIG. 9, and the like.

In this embodiment, the server 200 is configured to receive the position information obtained via the GPS function from the terminal device 201 and correct the received position information. However, the terminal device 201 may be configured to correct the position information obtained via the GPS function. In this case, the CPU 401 executes the process based on the program stored in the auxiliary storage unit 403, thus achieving the process similar to that of the flowchart of FIG. 9. The CPU 401 may be configured to indicate the position indicated by the position information after the correction on the display unit of the terminal device 201.

In this embodiment, the CPU 301 is configured to correct the position information every time when the position information is transmitted from the terminal device 201. However, the CPU 301 may be configured to correct the position information when the correction of the position information is commanded based on the operation by the user via the input device, or may be configured to correct the position information at a set timing. The CPU 301 may be configured to correct the position information every time when a set number of pieces of position information is received.

In this embodiment, as described with FIG. 5, the CPU 301 is configured to obtain the apparent acceleration of the terminal device 201 at the position information received from the terminal device 201, and correct that position information based on the obtained acceleration. However, the CPU 301 may be configured to obtain the apparent acceleration of the terminal device 201 at the position information received from the terminal device 201, and further perform the following process.

That is, the CPU 301 identifies the direction from the position indicated by the position information received two points before that position information to the position indicated by the position information received one point before that position information, and identifies the direction from the position indicated by the position information received two points before that position information to the position indicated by the position information received one point before that position information. Then, the CPU 301 identifies the change (for example, the traveling direction has changed by 120 degrees) of the traveling direction of the terminal device 201 from the identified two directions. Then, the CPU 301 may correct that position information based on the change of the identified traveling direction in addition to the obtained acceleration. For example, even when the obtained acceleration is less than the set threshold value, insofar as the magnitude of the change of the traveling direction is equal to or more than the set threshold value, the CPU 301 may determine the occurrence of the impossible movement and correct that position information by, for example, updating to the content of the position information one point before.

In this embodiment, the CPU 301 is configured to indicate the position indicated by the position information after correction on the display unit. However, the CPU 301 may be configured to switchingly indicate the position indicated by the position information after correction and the position indicated by the position information before correction on the display unit of the server 200 based on the operation by the user via the input device of the server 200.

In this embodiment, the CPU 301 is configured to perform the correction with the correction method described with FIG. 5 and the correction with the correction method described with FIG. 6 to the position information. However, the CPU 301 may be configured to perform only the correction with any one of these correction methods.

In this embodiment, the CPU 301 is configured to identify the reference position information as the reference of the correction link from the position information obtained before the correction target position information, and link the correction from the identified reference position information. However, the CPU 301 may perform the correction with the correction methods described with FIG. 5 and FIG. 6 using the position information immediately before without identifying the reference position information and linking the correction. Accordingly, the CPU 301 can reduce the load of the process for the correction link.

In this embodiment, the CPU 301 determines the retrieval range of the position information, which becomes the reference position information, as the position information obtained before the correction target position information during a set period immediately before the present (for example, in one hour immediately before). When the user carrying the terminal device 201 is indoors such as a house, a building, a plant, and a factory, it is difficult to obtain the position information having the accuracy equal to or more than the set level via the GPS function during staying indoors. When the user is indoors for a long time, the terminal device 201 cannot obtain the position information having the accuracy equal to or more than the set level via the GPS function for that long time in some cases. In such a case where the user is indoors for a period longer than this set period, the CPU 301 cannot retrieve the position information having the accuracy equal to or more than the set level to fail to accurately perform the correction in some cases.

Therefore, the CPU 301 may be configured to accept a designation of a period during which the user of the terminal device 201 is assumed to stay indoors based on the operation via the input device of the server 200. Then, the CPU 301 may determine the position information obtained before the correction target position information during the period immediately before the present and longer than the period indicated by the accepted designation as the retrieval range of the position information as the reference position information. Accordingly, the CPU 301 can raise the success rate of the retrieval of the position information having the accuracy equal to or more than the set level. The CPU 301 may be configured to obtain the information on the period during which the user of the terminal device 201 is assumed to stay indoors from a file stored in the auxiliary storage unit 303 and the like.

As described above, the preferred embodiments of the present invention have been described in detail. However, the present invention is not limited to such specific embodiments.

For example, a part of or the whole function compositions of the above-described information processing system may be implemented as hardware in the server 200 and the terminal device 201.

The invention claimed is:

1. A system comprising:
   an identifier configured to identify second position information from a plurality of pieces of position information of a terminal device, the plurality of pieces of position information being obtained via a position information obtainer before first position information of the terminal device, the first position information being obtained via the position information obtainer, the second position information being used for correcting the first position information; and a corrector configured to correct the first position information based on the second position information identified by the identifier;

wherein the corrector corrects the first position information based on the second position information identified by the identifier and the position information obtained after the second position information via the position information obtainer in the position information of the terminal device obtained via the position information obtainer;

wherein the corrector sequentially corrects the respective pieces of the position information obtained after the second position information via the position information obtainer and the first position information based on the second position information identified by the identifier; and wherein the corrector determines the second position information identified by the identifier as position information for correction, the position information for correction being position information used for correction, determines the position information obtained after the second position information via the position information obtainer as position information to be corrected, the position information to be corrected being correction target position information, and corrects the position information to be corrected based on the position information for correction, and subsequently, the corrector determines the corrected position information to be corrected as new position information for correction, determines the position information obtained after the position information for correction via the position information obtainer as new position information to be corrected, corrects the position information to be corrected based on the position information for correction, and iterates a process of the corrections until the first position information is corrected as the position information to be corrected.

2. The system according to claim 1, wherein the identifier identifies the second position information used for correcting the first position information from the plurality of pieces of position information based on accuracy information, the accuracy information is included in the plurality of pieces of position information and corresponds to the respective pieces of the position information.

3. The system according to claim 1, wherein the identifier identifies the second position information used for correcting the first position information from the plurality of pieces of position information based on whether an accuracy is equal to or more than a set level, the accuracy is indicated by the accuracy information included in the plurality of pieces of position information and corresponding to the respective pieces of the position information.

4. The system according to claim 3, wherein the identifier identifies latest position information in the position information included in the plurality of pieces of position information and having the accuracy equal to or more than the set level as the second position information used for correcting the first position information.

5. The system according to claim 1, wherein the corrector corrects the first position information based on the second position information identified by the identifier and a movement distance of the terminal device at a position indicated by the first position information.

6. The system according to claim 5, wherein the corrector corrects the first position information based on the second position information identified by the identifier and an acceleration of the terminal device at the position indicated by the first position information, the acceleration of the terminal device is obtained based on the movement distance of the terminal device at the position indicated by the first position information.

7. The system according to claim 1, wherein the corrector corrects the first position information based on the second position information identified by the identifier and accuracy information of the first position information.

8. The system according to claim 1, further comprising an outputter configured to output the first position information corrected by the corrector.

9. The system according to claim 1, wherein the position information obtainer is a GPS function.

10. An information processing device comprising:
an identifier configured to identify second position information from a plurality of pieces of position information of a terminal device, the plurality of pieces of position information being obtained via a position information obtainer before first position information of the terminal device, the first position information being obtained via the position information obtainer, the second position information being used for correcting the first position information; and a corrector configured to correct the first position information based on the second position information identified by the identifier;

wherein the corrector corrects the first position information based on the second position information identified by the identifier and the position information obtained after the second position information via the position information obtainer in the position information of the terminal device obtained via the position information obtainer;

wherein the corrector sequentially corrects the respective pieces of the position information obtained after the second position information via the position information obtainer and the first position information based on the second position information identified by the identifier; and wherein the corrector determines the second position information identified by the identifier as position information for correction, the position information for correction being position information used for correction, determines the position information obtained after the second position information via the position information obtainer as position information to be corrected, the position information to be corrected being correction target position information, and corrects the position information to be corrected based on the position information for correction, and subsequently, the corrector determines the corrected position information to be corrected as new position information for correction, determines the position information obtained after the position information for correction via the position information obtainer as new position information to be corrected, corrects the position information to be corrected based on the position information for correction, and iterates a process of the corrections until the first position information is corrected as the position information to be corrected.

11. An information processing method executed by a system, the method comprising:

an identifying step of identifying second position information from a plurality of pieces of position information of a terminal device, the plurality of pieces of position information being obtained via a position information obtainer before first position information of the terminal device, the first position information being obtained via the position information obtainer, the second position information being used for correcting the first position information; and a correcting step of correcting the first position information based on the second position information identified in the identifying step;

wherein the correcting step corrects the first position information based on the second position information identified by the identifying step and the position information obtained after the second position information via the position information obtainer in the position information of the terminal device obtained via the position information obtainer;

wherein the correcting step sequentially corrects the respective pieces of the position information obtained after the second position information via the position information obtainer and the first position information based on the second position information identified by the identifier; and wherein the correcting step determines the second position information identified by the identifier as position information for correction, the position information for correction being position information used for correction, determines the position information obtained after the second position information via the position information obtainer as position information to be corrected, the position information to be corrected being correction target position information, and corrects the position information to be corrected based on the position information for correction, and subsequently, the corrector determines the corrected position information to be corrected as new position information for correction, determines the position information obtained after the position information for correction via the position information obtainer as new position information to be corrected, corrects the position information to be corrected based on the position information for correction, and iterates a process of the corrections until the first position information is corrected as the position information to be corrected.

12. An information processing method executed by an information processing device, the method comprising:

an identifying step of identifying second position information from a plurality of pieces of position information of a terminal device, the plurality of pieces of position information being obtained via a position information obtainer before first position information of the terminal device, the first position information being obtained via the position information obtainer, the second position information being used for correcting the first position information; and a correcting step of correcting the first position information based on the second position information identified in the identifying step;

wherein the correcting step corrects the first position information based on the second position information identified by the identifying step and the position information obtained after the second position information via the position information obtainer in the position information of the terminal device obtained via the position information obtainer;

wherein the correcting step sequentially corrects the respective pieces of the position information obtained after the second position information via the position information obtainer and the first position information based on the second position information identified by the identifier; and wherein the correcting step determines the second position information identified by the identifier as position information for correction, the position information for correction being position information used for correction, determines the position information obtained after the second position information via the position information obtainer as position information to be corrected, the position information to be corrected being correction target position information, and corrects the position information to be corrected based on the position information for correction, and subsequently, the corrector determines the corrected position information to be corrected as new position information for correction, determines the position information obtained after the position information for correction via the position information obtainer as new position information to be corrected, corrects the position information to be corrected based on the position information for correction, and iterates a process of the corrections until the first position information is corrected as the position information to be corrected.

13. A computer-readable non-transitory recording medium that stores a program to cause a computer to execute:

an identifying step of identifying second position information from a plurality of pieces of position information of a terminal device, the plurality of pieces of position information being obtained via a position information obtainer before first position information of the terminal device, the first position information being obtained via the position information obtainer, the second position information being used for correcting the first position information; and a correcting step of correcting the first position information based on the second position information identified in the identifying step;

wherein the correcting step corrects the first position information based on the second position information identified by the identifying step and the position information obtained after the second position information via the position information obtainer in the position information of the terminal device obtained via the position information obtainer;

wherein the correcting step sequentially corrects the respective pieces of the position information obtained after the second position information via the position information obtainer and the first position information based on the second position information identified by the identifier; and wherein the correcting step determines the second position information identified by the identifier as position information for correction, the position information for correction being position information used for correction, determines the position information obtained after the second position information via the position information obtainer as position information to be corrected, the position information to be corrected being correction target position information, and corrects the position information to be corrected based on the position information for correction, and subsequently, the corrector determines the corrected position information to be corrected as new position information for correction, determines the position information obtained after the position information for correction via the position information obtainer as new position information to be corrected, corrects the position information to be corrected based on the position information for correction, and iterates a process of the corrections until the first position information is corrected as the position information to be corrected.

\* \* \* \* \*